United States Patent
Ly

(10) Patent No.: US 10,420,063 B2
(45) Date of Patent: Sep. 17, 2019

(54) ON-DEMAND USER EQUIPMENT POSITIONING

(71) Applicant: QUALCOMM Incorporated, San Diego, CA (US)

(72) Inventor: Hung Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/884,869

(22) Filed: Jan. 31, 2018

(65) Prior Publication Data

US 2018/0220392 A1    Aug. 2, 2018

Related U.S. Application Data

(60) Provisional application No. 62/454,025, filed on Feb. 2, 2017.

(51) Int. Cl.
| | |
|---|---|
| *H04W 64/00* | (2009.01) |
| *H04W 72/04* | (2009.01) |
| *H04W 48/12* | (2009.01) |
| *H04L 5/00* | (2006.01) |
| *G01S 5/00* | (2006.01) |

(Continued)

(52) U.S. Cl.
CPC ........... *H04W 64/006* (2013.01); *G01S 5/00* (2013.01); *G01S 5/0236* (2013.01); *G01S 5/10* (2013.01); *H04L 5/005* (2013.01); *H04L 5/0048* (2013.01); *H04L 5/0053* (2013.01); *H04W 48/12* (2013.01); *H04W 64/00* (2013.01); *H04W 72/048* (2013.01)

(58) Field of Classification Search
CPC ....... H04W 4/02; H04W 4/023; H04W 4/025; H04W 24/10; H04W 48/12; H04W 64/00; H04W 72/042; H04W 72/048; H04W 74/0833; H04W 76/14; H04W 88/02; H04W 88/08; H04L 5/0048
See application file for complete search history.

(56) References Cited

U.S. PATENT DOCUMENTS

| | | | |
|---|---|---|---|
| 8,274,959 B2 * | 9/2012 | Lee | H04L 5/0053 370/338 |
| 9,769,621 B2 | 9/2017 | Xiao et al. | |

(Continued)

FOREIGN PATENT DOCUMENTS

| | | |
|---|---|---|
| EP | 3206427 A1 | 8/2017 |
| WO | 2016054808 A1 | 4/2016 |

(Continued)

OTHER PUBLICATIONS

Introduction to OTDOA on LTE Networks Aug. 7, 2014 (Year: 2014).*

(Continued)

*Primary Examiner* — Ernest G Tacsik
(74) *Attorney, Agent, or Firm* — Linda G. Gunderson; Patterson & Sheridan LLP

(57) ABSTRACT

Certain aspects of the present disclosure relate to methods and apparatus for on-demand UE positioning. For example a method may include transmitting a request, to at least one of a plurality of base stations of a network, to participate in at least one of an uplink UE positioning procedure or a downlink UE positioning procedure, and receiving a configuration for the at least one of the uplink UE positioning procedure or the downlink UE positioning procedure in response to the request.

7 Claims, 15 Drawing Sheets

(51) Int. Cl.
*G01S 5/02* (2010.01)
*G01S 5/10* (2006.01)

(56) References Cited

U.S. PATENT DOCUMENTS

| | | | |
|---|---|---|---|
| 2011/0117926 A1* | 5/2011 | Hwang | H04W 64/00 455/456.1 |
| 2015/0078335 A1* | 3/2015 | Sivanesan | H04W 74/0833 370/331 |
| 2015/0133157 A1* | 5/2015 | Xiao | H04W 4/02 455/456.1 |
| 2017/0079006 A1 | 3/2017 | Li et al. | |
| 2017/0150475 A1 | 5/2017 | Li et al. | |
| 2017/0288897 A1* | 10/2017 | You | H04W 64/003 |
| 2017/0347270 A1* | 11/2017 | Iouchi | H04W 16/14 |
| 2017/0347350 A1* | 11/2017 | Takeda | H04W 72/04 |
| 2018/0109971 A1* | 4/2018 | Takeda | H04W 28/0215 |

FOREIGN PATENT DOCUMENTS

| | | |
|---|---|---|
| WO | 2016196431 A1 | 12/2016 |
| WO | 2017029213 A1 | 2/2017 |

OTHER PUBLICATIONS

ZTE: "Comparison of NB-IoT Positioning Solution", 3GPP TSG RAN WG1 Meeting #86, R1-167324, Gothenburg, Sweden Aug. 22-26, 2016, 5 Pages.
3rd Generation Partnership Project; Technical Specification Group Radio Access Network; Evolved Universal Terrestrial Radio Access (E-UTRA); LTE Positioning Protocol (LPP) (Release 14), 3GPP Standard; 3GPP TS 36.355, 3rd Generation Partnership Project (3GPP), Mobile Competence Centre, 650, Route Des Lucioles, F-06921 Sophia-Antipolis Cedex, France, vol. RAN WG2, No. V14.0.0, Dec. 30, 2016 (Dec. 30, 2016), pp. 1-151, XP051230323, [retrieved on Dec. 30, 2016].
International Search Report and Written Opinion—PCT/US2018/016339—ISA/EPO—dated May 7, 2018.

* cited by examiner

SS: synchronization signals
PBCH: physical broadcast channel
(carrying MIB)
PRS: positioning RS
MSIB: minimum SIB
OSIB: other SIB

ON-DEMAND USER EQUIPMENT POSITIONING

CLAIM OF PRIORITY UNDER 35 U.S.C. § 119

The present application for patent claims benefit of U.S. Provisional Patent Application Ser. No. 62/454,025, filed Feb. 2, 2017, assigned to the assignee hereof and hereby expressly incorporated by reference herein.

BACKGROUND

Field of the Disclosure

The present disclosure relates generally to communication systems, and more particularly, to methods and apparatus for on-demand user equipment (UE) positioning in communications systems operating according to new radio (NR) technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station. The method generally includes receiving a request, from a user equipment (UE), to participate in at least one of an uplink or a downlink UE positioning procedure, and transmitting a configuration on-demand for the at least one of the uplink or downlink UE positioning procedure based on the request.

Certain aspects provide a method for wireless communication by a user equipment. The method generally includes transmitting a request, to at least one of a plurality of base stations of a network, to participate in at least one of an uplink UE positioning procedure or a downlink UE positioning procedure, and receiving a configuration for the at least one of the uplink UE positioning procedure or the downlink UE positioning procedure in response to the request.

Certain aspects provide a method for wireless communication by a base station. The method generally includes transmitting an indication that at least one of an uplink or a downlink UE positioning procedure is supported by the base station and other base stations in a network, and participating in an on-demand uplink or a downlink UE positioning procedure with at least one UE in the network based on a request from the at least one UE.

Certain aspects provide a method for wireless communication by a user equipment. The method generally includes receiving an indication that a plurality of base stations in a network support at least one of an uplink UE positioning procedure or a downlink UE positioning procedure, and participating in an uplink or a downlink UE positioning procedure with the plurality of base stations, based on the indication.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
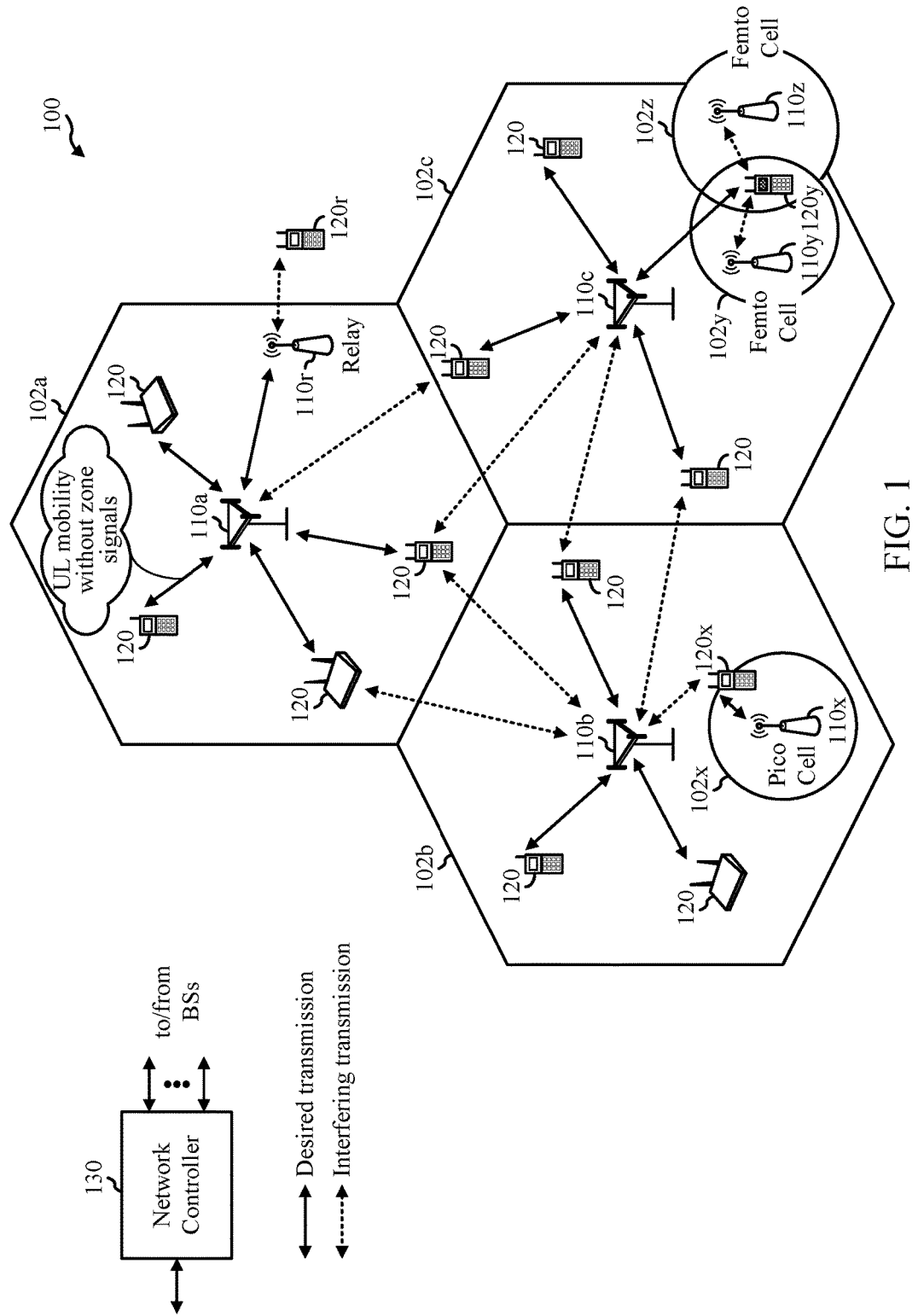
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
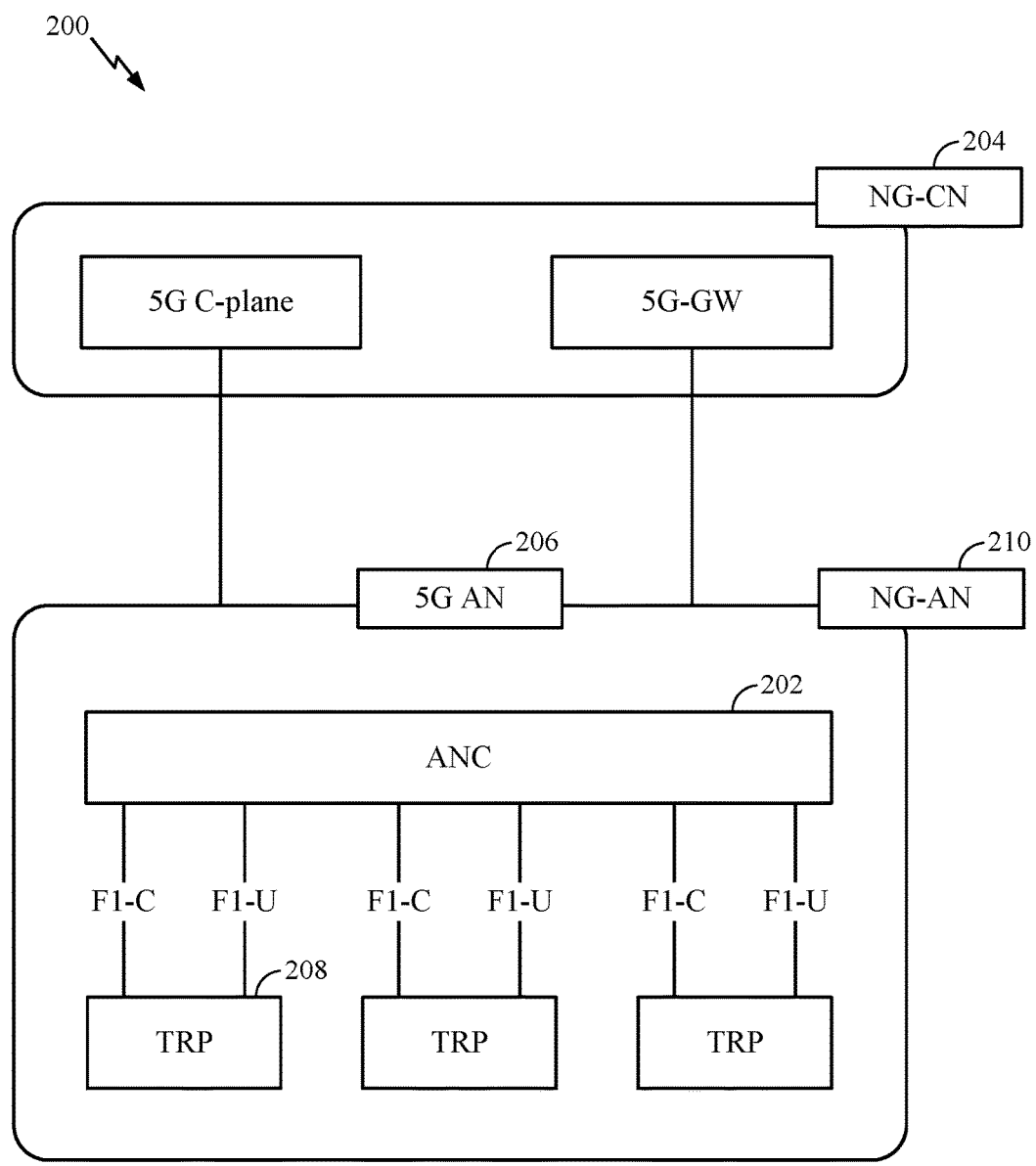
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
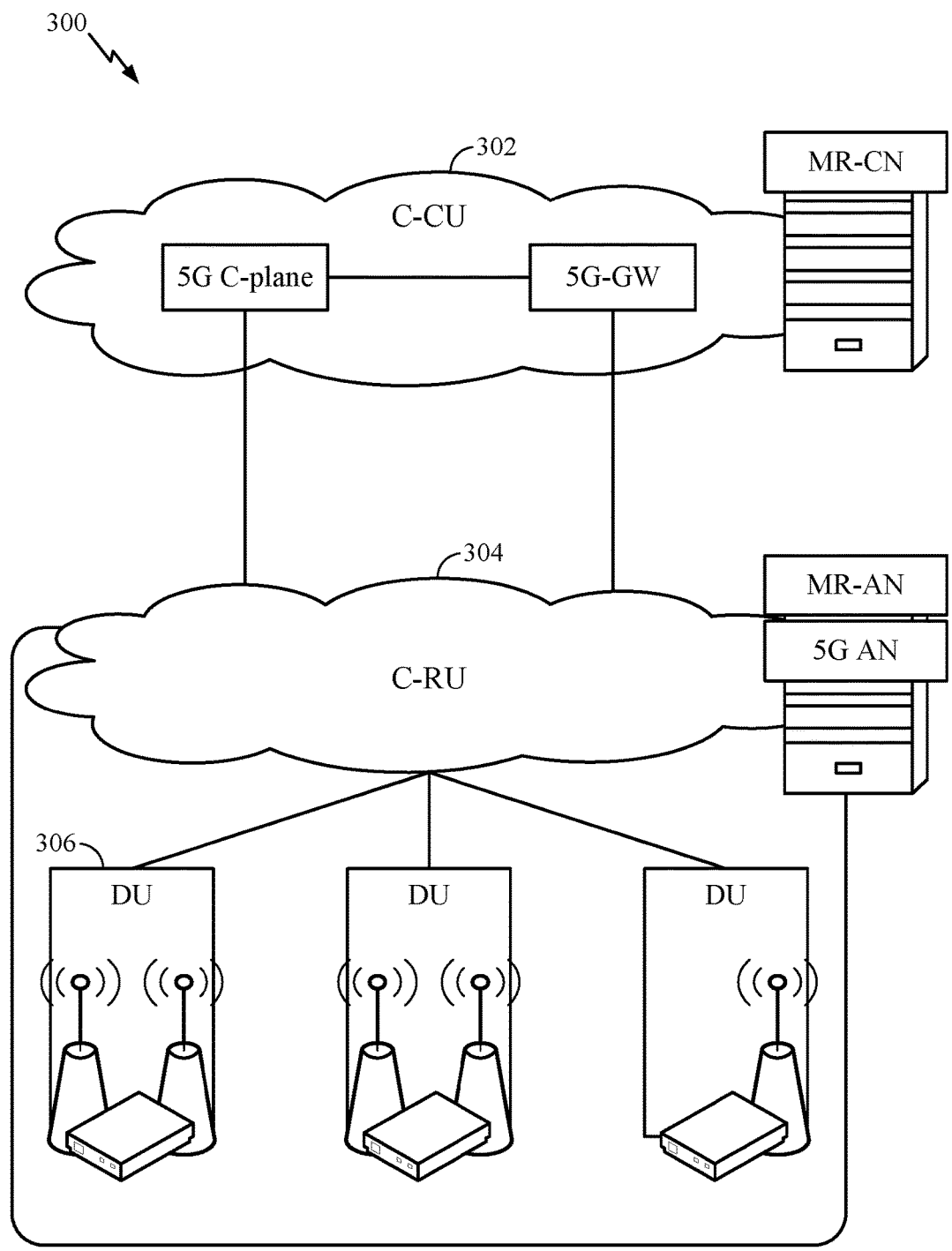
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
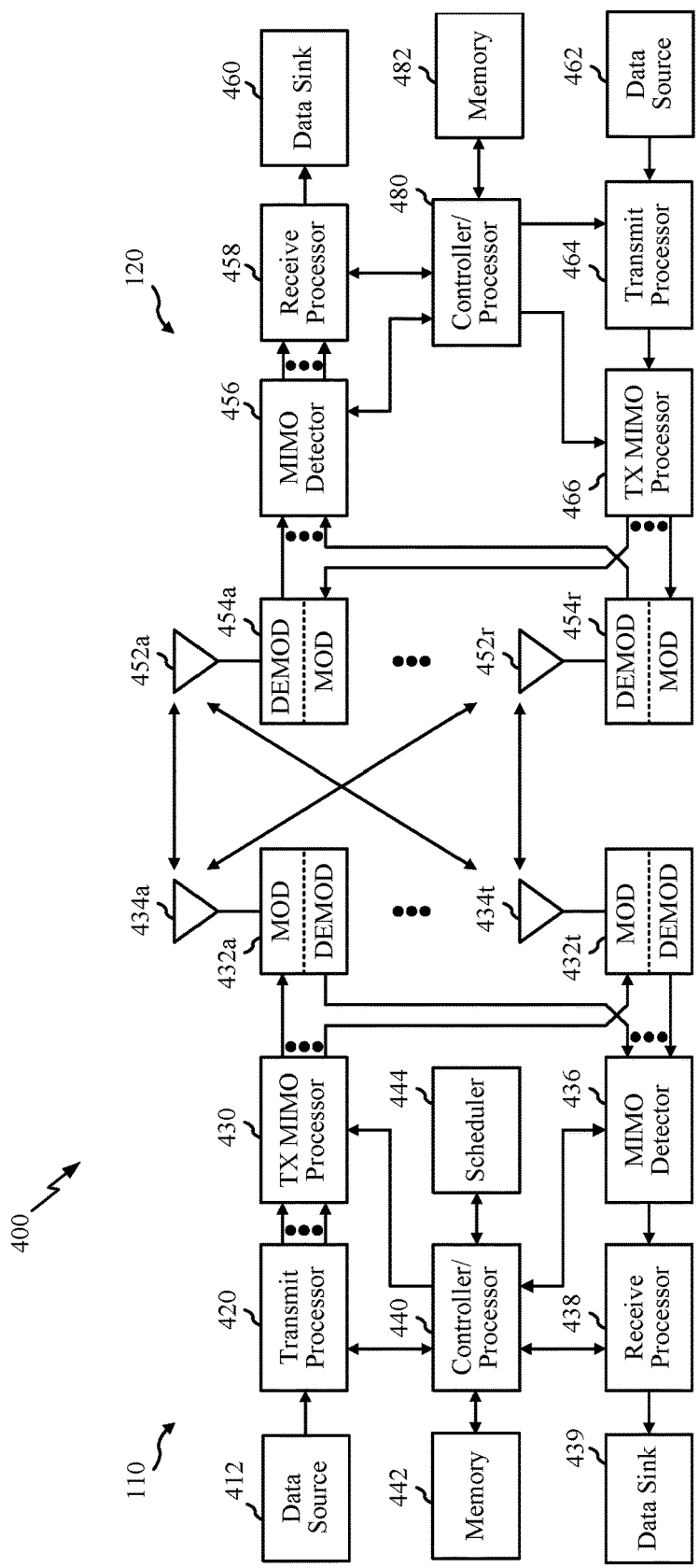
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, transceivers that includes antennas 452, processors 466, 458, 464, and/or controller/processor 480 of the UE 120 and/or transceivers that include antennas 434, processors 460, 420, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted using a transceiver, for example, via the antennas 434a through 434t, respectively.

At the UE 120, one or more transceivers that include the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
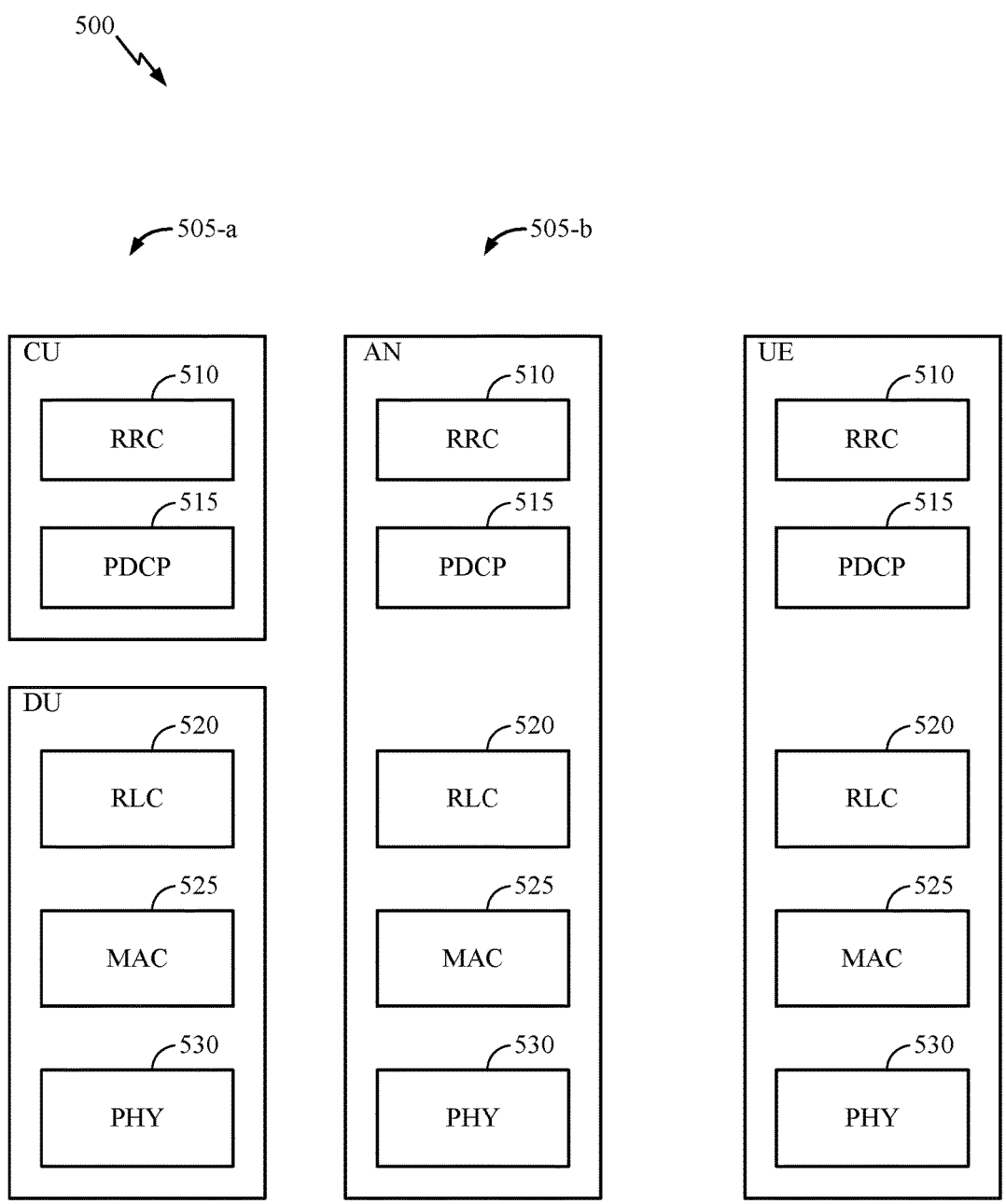
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
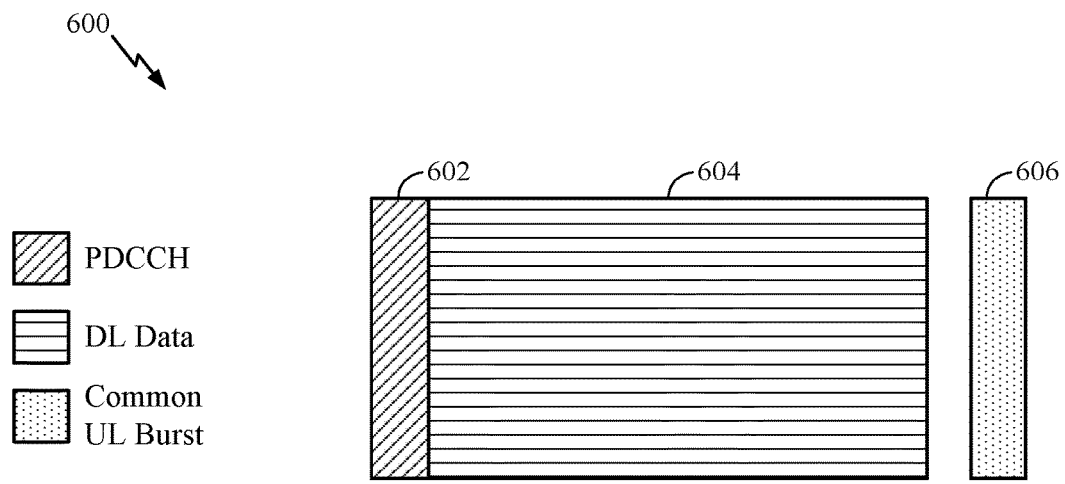
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
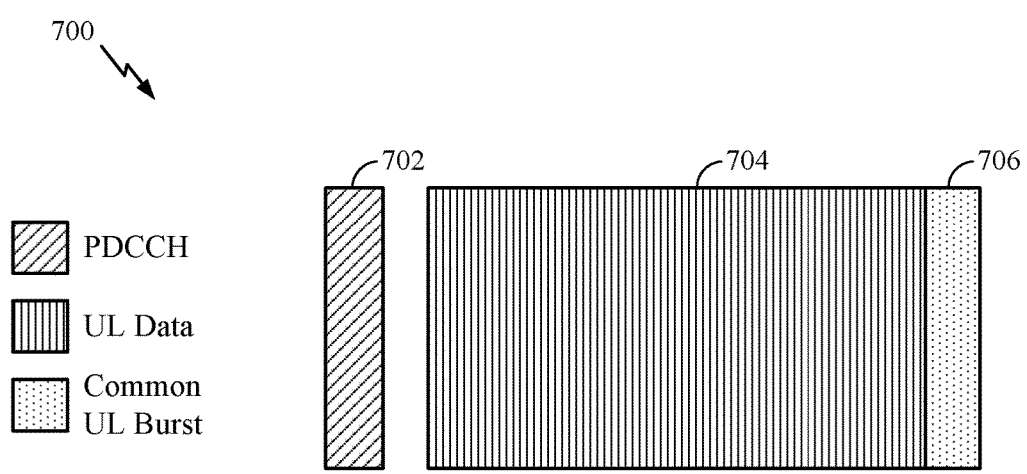
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of UE Positioning

According to aspects, and as will be described in more detail herein, multiple base stations (BSs) (e.g., Node Bs, TRPs, APs) of a wireless network may communicate with a UE. Further, in such communications, multiple Node BSs may be geographically separated from each other as well as the UE. The geographical position of the UE may often be determined in order to provide and improve communications between the base stations and the UE.

Positioning reference signals (PRSs) were introduced in LTE Release 9 to assist in determining the location of User Equipment (UE) based on radio access network information. In general, PRS signals may be transmitted within pre-defined bandwidth and according to a set of configuration parameters such as subframe offset, periodicity, and duration. The PRS bandwidth may be configurable on a per-cell basis, where 1.4, 3, 5, 10, 15, and 20 MHz bandwidths are supported. However, regardless of the bandwidth, PRS may be transmitted in the center resource blocks of a given bandwidth. Additionally, in some cases, PRS periodicity may be fixed such that all repetitions of PRS use the same bandwidth.

Further, each cell may apply a different muting pattern (defining times where the cell does not transmit PRS) in an effort to avoid interference with PRS transmitted from other cells. PRS may be transmitted at pre-defined subframes and repeated (e.g., in several consecutive subframes, with each set of subframes referred to as a "positioning occasion"). The sequence transmitted as a PRS may be based on any suitable known sequence. PRS from different cells may be multiplexed in the code domain (e.g., each cell transmitting a different (orthogonal) PRS sequence), in the frequency domain (e.g., at different frequency offsets), and/or in the time domain (e.g., using time based blanking).

As noted above, PRSs may be used in determining the location of UE, for example, based on radio access network information. The process of determining the location of a UE follows three major steps. For example, a UE may first receive PRSs from its serving cell and neighboring cells. Based on the received PRSs, the UE may measure observed time difference of arrival (OTDOA) and report a reference signal time difference (RSTD) measurement to its serving cell. The network may then use the RTSD measurement to calculate the longitude and latitude of the UE.

Figure 8:
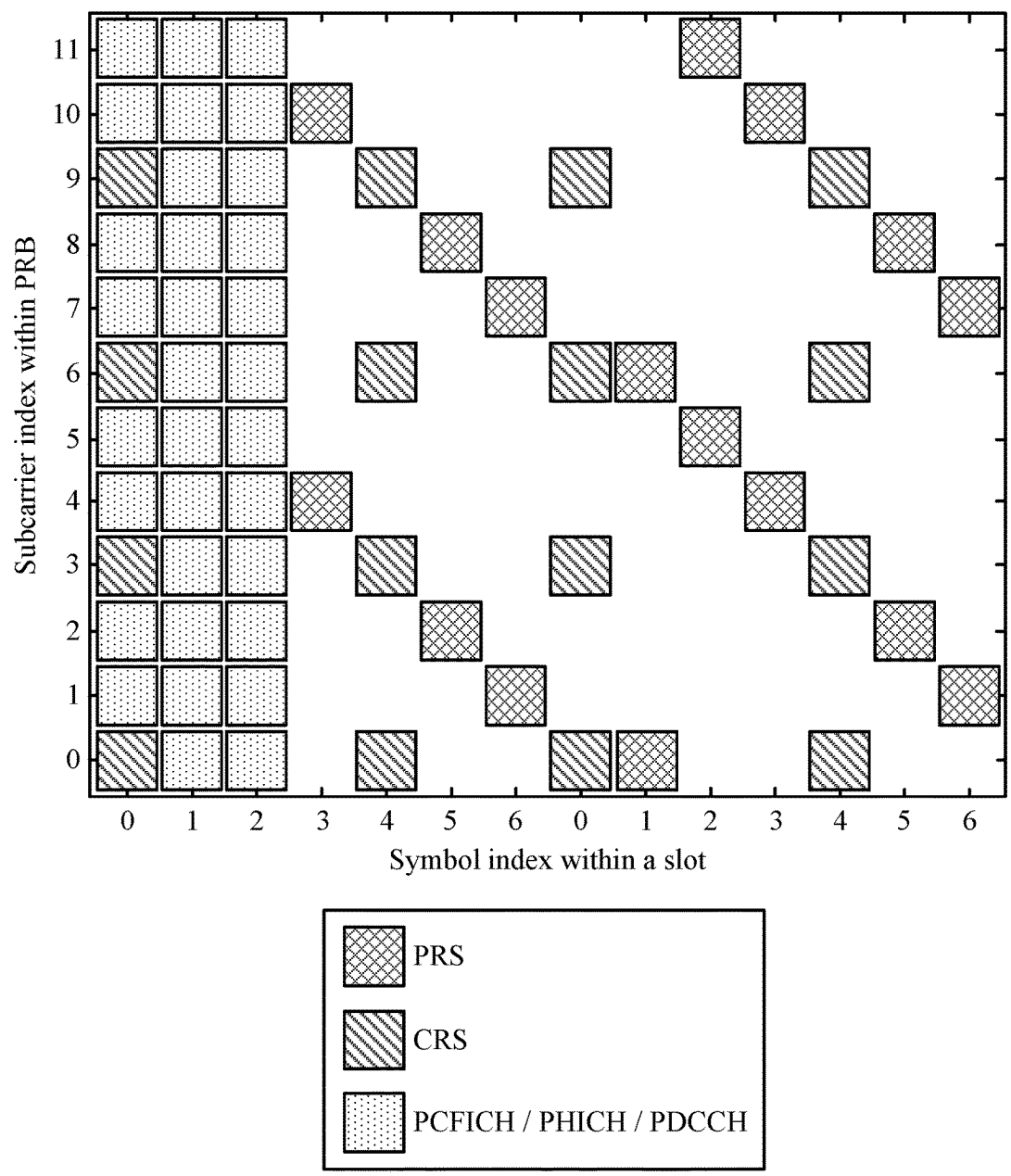
FIG. 8 illustrates an example subframe configuration scenario, in which aspects of the present disclosure may be practiced.

A specific example of a traditional LTE UE positioning reference signal (RS) scenario is shown in FIG. 8. Particularly, FIG. 8 shows an example subframe configuration for LTE UE positioning RS (PRS). FIG. 8 shows an example CRS pattern, an example PRS pattern, and example PCFICH, PHICH, and PDCCH patterns.

In this example of LTE UE Positioning RS, a PRS can be broadcast periodically with a PRS periodicity of 160, 320, 640, and/or 1280 ms. The PRS may be generated similarly to CRS in this scenario as shown. For example, a seed for a PN sequence generator may depend on a slot index, a symbol index, and a cell ID. Frequency reuse may also be provided by providing, for example, six possible diagonal frequency shift patterns, staggering PRS REs to reduce PRS collision, and by avoiding PRS collision by, for example, setting cell 0 to have the identical PRS as cell 6. In this example subframes (1, 2) and (4, 6) are considered consecutive subframes. Some features of this LTE UE positioning RS scenario can include no data transmission in RBs comprising PRS for low interference, eNBs being synchronized, as well as PRS muting to improve detectability defined as an ability to detect weak cell transmissions.

Example on-Demand UE Positioning

In one or more aspects of embodiments described herein, in NR UE positioning, reference signals and physical channels (with the possible exception of synchronization signals, PBCH/MIB, and/or PDSCH carrying MSIB) may be transmitted on-demand or event-triggered for network energy savings. In NR UE positioning a UE may use synchronization signals for UE positioning.

Figure 9:
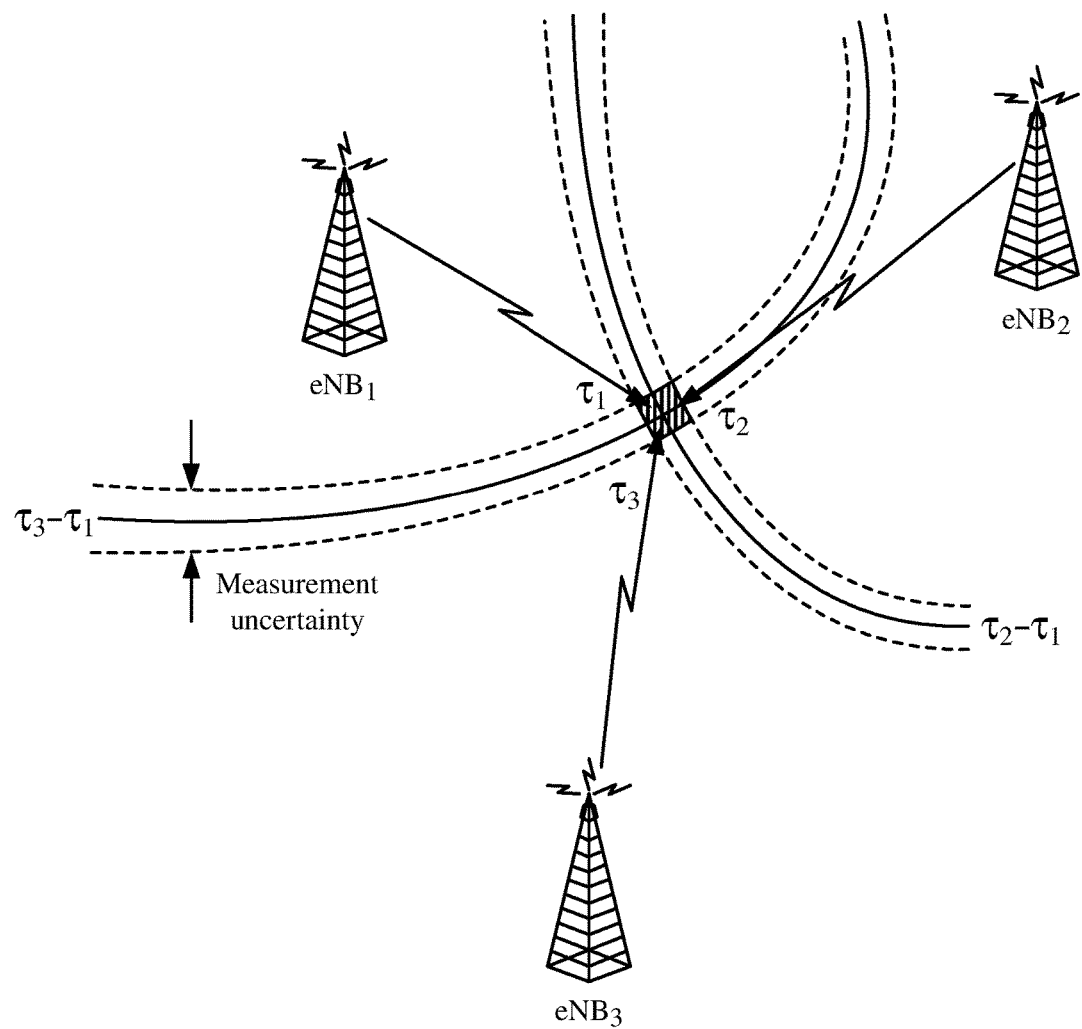
FIG. 9 illustrates an example positioning scenario, in which aspects of the present disclosure may be practiced.

As shown in FIG. 9, curves may be defined in which a measured difference in arrival time of a reference signal (transmitted at the same time) from two base stations (e.g., eNB1 and eNB2 or eNB1 and eNB3) at the same UE is the same. In other words, at any point along such a curve, the difference in time of arrival (DTOA) should be the same. By finding the intersection between three or more such curves (for three or more different pairs of eNBs), a fairly accurate estimate of UE position may be determined.

However, in some cases it may not be guaranteed that the UE may detect arrival times of at least three base stations' transmissions, as shown in FIG. 9, to estimate the UE's location. Accordingly, a reference signal and procedures may be introduced to support UE positioning while also providing network energy savings.

In accordance with one or more aspects, one or more on-demand positioning procedures for NR may be defined. For example, on-demand downlink (DL) based UE positioning may be provided as discussed below and shown in FIGS. 10-13 and 14. Similarly, on-demand uplink (UL) based UE positioning may be provided as discussed below and shown in FIGS. 10-13 and 15. According to one or more cases, network signals may be provided that may indicate UE positioning capability in system information (e.g., minimum system information block (MSIB)). An example of the UE positioning capabilities that can be indicated may include, for example, whether on-demand UE positioning is supported instead of broadcast positioning reference signal (RS). Another UE positioning capability that may be indicated may include on-demand DL-based UE positioning or On-demand UL-based UE positioning.

Figure 10:
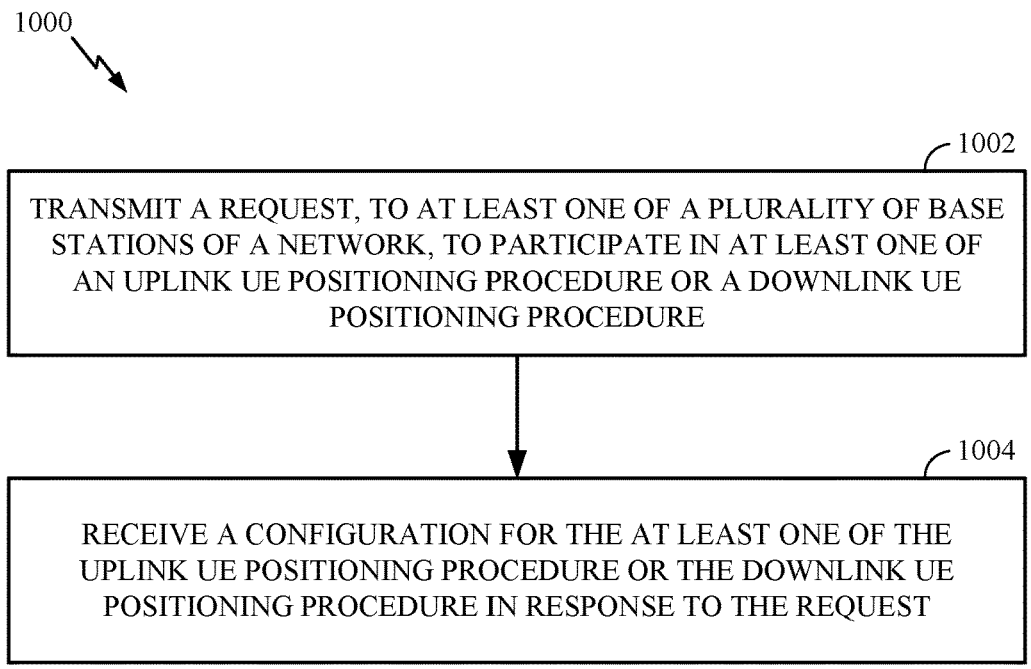
FIG. 10 illustrates example operations for wireless communications by a UE, in accordance with aspects of the present disclosure.

Aspects of the present disclosure provide techniques and apparatus for providing on-demand UE positioning using a PRS. For example, FIG. 10 illustrates example operations 1000 for wireless communications by a UE, in accordance with aspects of the present disclosure.

Operations 1000 begin, at block 1002, with the UE transmitting a request, to at least one of a plurality of base stations of a network, to participate in at least one of an uplink UE positioning procedure or a downlink UE positioning procedure. At 1004, the UE receives a configuration for the at least one of the uplink UE positioning procedure or the downlink UE positioning procedure in response to the request. In one or more cases, the configuration of the request may be signaled in MSIB.

In one or more cases, the request is to participate in the downlink UE positioning procedure, and the received configuration is for the downlink UE positioning procedure. In some cases, the configuration may be received in an information block. In some cases, operations 1000 may further include receiving a downlink PRS from at least three of the base stations based on the request, in accordance with the configuration, measuring a PRS time difference based on the downlink PRS, and reporting the PRS time difference to the base station. Additionally, operations 1000 may further include receiving configuration information indicating resources for transmitting the request, and transmitting the request in accordance with the configuration information.

In one or more cases, the request is to participate in the uplink UE positioning procedure, and the received configuration is for the uplink UE positioning procedure. In some cases, operations 1000 may further include transmitting an uplink PRS to the base stations, in accordance with the configuration. According to aspects of the present disclosure, the PRS has a first format if the UE is in a first radio resource control (RRC) state or a second format if the UE is in a second radio RRC state.

According to aspects of the present disclosure, operations 1000 may further include determining a format of at least one of uplink or downlink PRS based on at least one of a service requirement of communications performed by the UE, or operating bandwidth of the communications. In some cases, the configuration indicates at least one of a numerology, periodicity, or reference signal (RS) pattern for a PRS.

Figure 11:
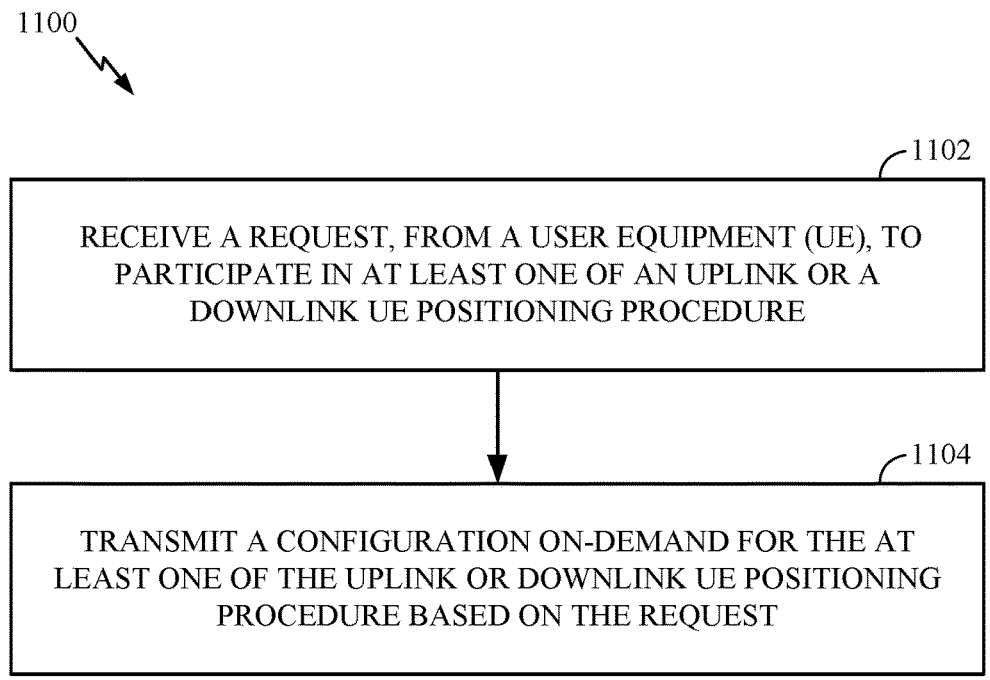
FIG. 11 illustrates example operations for wireless communications by a base station, in accordance with aspects of the present disclosure.

FIG. 11 illustrates example operations 1100 for wireless communications by a base station, in accordance with aspects of the present disclosure.

Operations 1100 begin, at block 1102, with the UE receiving a request, from a user equipment (UE), to participate in at least one of an uplink or a downlink UE positioning procedure. Operations 1100 further include, at block 1104, the UE transmitting a configuration on-demand for the at least one of the uplink or downlink UE positioning procedure based on the request. In one or more cases, the request is to participate in the downlink UE positioning procedure, and the configuration is for the downlink UE positioning procedure. In one or more cases, examples of the configuration may include PRS resource allocation, PRS periodicity and pattern, and/or request configuration. In one or more cases, PRS may be a physical channel in UE positioning procedures.

In some cases, operations 1100 may further include transmitting, based on the request, a downlink PRS to the UE on-demand in accordance with the configuration, and receiving a report of a PRS time difference calculated by the UE based on the transmitted downlink PRS and downlink PRS transmitted by at least one other base station. According to aspects of the present disclosure, operations 1100 may further include transmitting configuration information indicating resources for the UE to use for transmitting the request, and receiving the request in accordance with the configuration information.

In one or more cases, the request is to participate in the uplink UE positioning procedure, and the configuration is for the uplink UE positioning procedure. Additionally, operations 1100 may further include receiving an uplink PRS to the base stations, in accordance with the configuration. In some cases, the configuration may be transmitted in an information block. In some cases, operations 1100 may further include determining a format of at least one of uplink or downlink PRS based on at least one of a service requirement of communications performed by the UE, or operating bandwidth of the communications.

Figure 12:
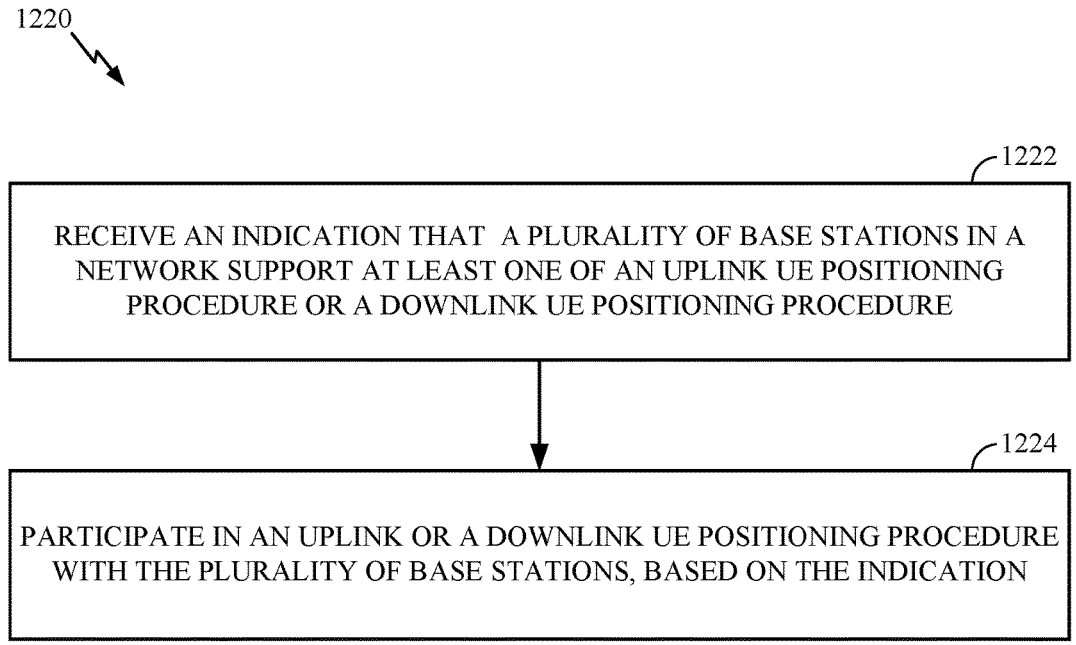
FIG. 12 illustrates example operations for wireless communications by a UE, in accordance with aspects of the present disclosure.

Additionally, the configuration may indicate at least one of a numerology, periodicity, or reference signal (RS) pattern for a PRS. According to aspects of the present disclosure, the PRS has a first format if the UE is in a first radio resource control (RRC) state, or a second format if the UE is in a second radio RRC state FIG. 12 illustrates example operations 1200 for wireless communications by a UE, in accordance with aspects of the present disclosure.

Operations 1200 begin, at block 1202, with the UE receiving an indication that a plurality of base stations in a network supports at least one of an uplink UE positioning procedure or a downlink UE positioning procedure. Operations 1200 further include, at block 1204, the UE participating in an uplink or a downlink UE positioning procedure with the plurality of base stations, based on the indication. In some cases, the indication is received in a broadcast message with system information.

In one or more cases, participating may include transmitting a request using at least one of a message 1 (MSG 1) or a message 3 (MSG 3), and receiving a downlink (DL) positioning reference signal (PRS) based on the request In some cases, participating may include receiving broadcast downlink PRS from the plurality of base stations, measuring a PRS time difference based on the downlink PRS, and reporting the PRS time difference to the base station. According to aspects of the present disclosure, the indication indicates that the base stations support at least one of an on-demand downlink UE positioning procedure or an on-demand uplink UE positioning procedure. Additionally, the participating includes transmitting a request, to at least one of the plurality of base stations, to participate in at least one of the uplink UE positioning procedure or the downlink UE positioning procedure.

Figure 13:
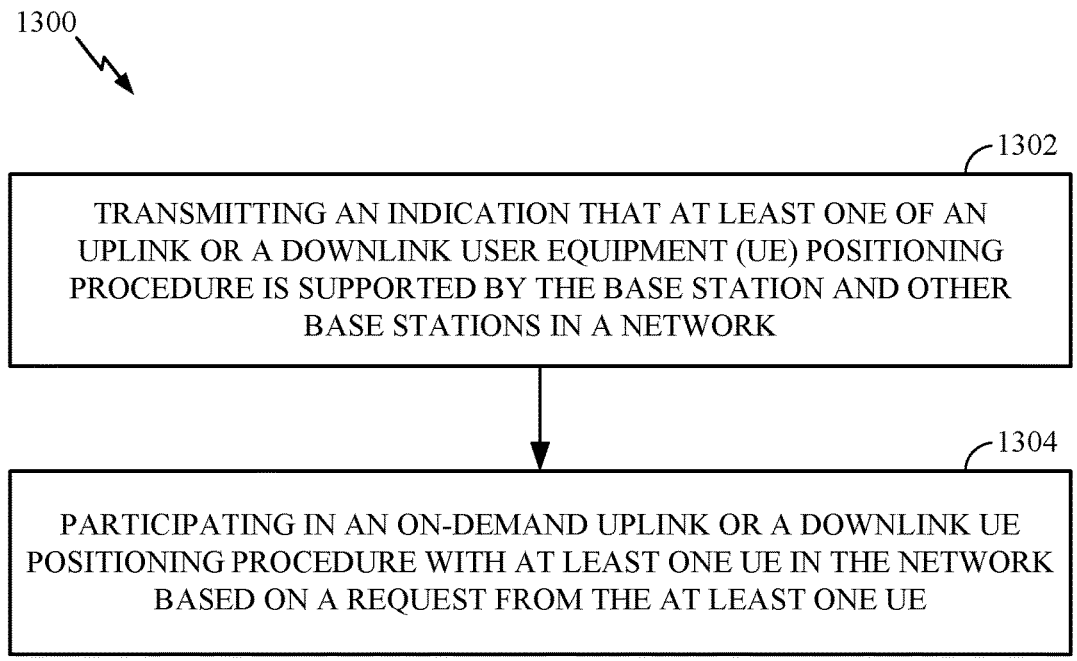
FIG. 13 illustrates example operations for wireless communications by a base station, in accordance with aspects of the present disclosure.

FIG. 13 illustrates example operations 1300 for wireless communications by a base station, in accordance with aspects of the present disclosure.

Operations 1300 begin, at block 1302, with the UE transmitting an indication that at least one of an uplink or a downlink UE positioning procedure is supported by the base station and other base stations in a network. Operations 1300 further include, at block 1304, the UE participating in an uplink or a downlink UE positioning procedure with at least one UE in the network. In some cases, the indication is transmitted in a broadcast message with system information.

In one or more cases, participating may include receiving the request using at least one of a message 1 (MSG 1) or a message 3 (MSG 3), and transmitting a downlink (DL)

positioning reference signal (PRS) based on the request. In some cases, participating may include broadcasting downlink PRS, and receiving a report of a PRS time difference calculated by the UE based on the broadcast downlink PRS and downlink PRS transmitted by at least one other base station. According to aspects of the present disclosure, the indication is that the base stations support at least one of an on-demand downlink UE positioning procedure or an on-demand uplink UE positioning procedure. Further, the participating comprises receiving a request, from the UE, to participate in at least one of the uplink UE positioning procedure or the downlink UE positioning procedure.

Figure 14:
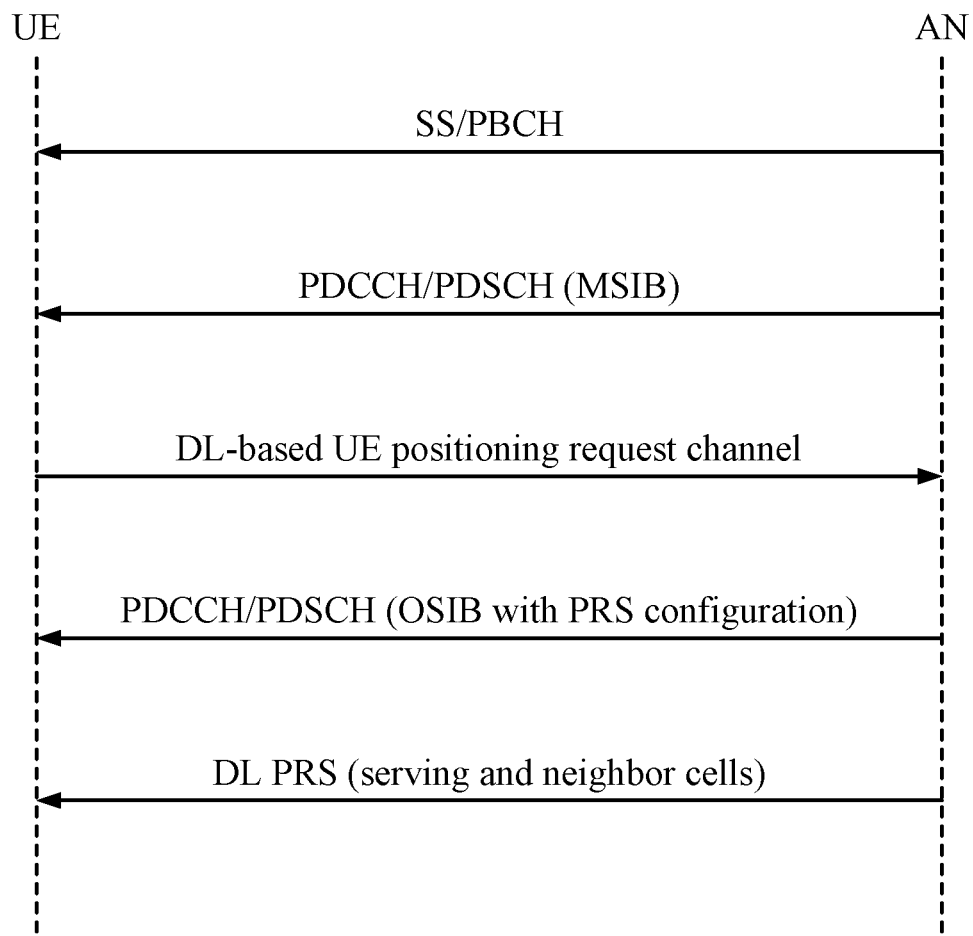
FIG. 14 illustrates an example downlink (DL) based UE positioning scenario, in which aspects of the present disclosure may be practiced.

FIG. 14 illustrates a call flow diagram for an example downlink (DL) based UE positioning scenario, in which aspects of the present disclosure may be practiced. As shown in FIG. 14, the example of On-demand DL-based UE Positioning includes a number of operations that make up the positioning procedure.

As shown, a SS/PBCH transmission and a PDCCH/PDSCH (MSIB) transmission may be provided from the network (AN) to the UE. The UE receives these transmissions and reads the MIB/MSIB indicating that DL-based positioning can be supported.

As shown, the UE may transmit a request to one or more base stations requesting the network send DL PRS (e.g., when the UE positioning service is triggered), for example, via a DL PRS request channel. The network may respond by sending a DL PRS configuration, for example in an OSIB (other System information block). Additionally, in some cases, one or more base stations acting as a serving cell and as neighbor cells may transmit a DL PRS in response to the request from the UE (e.g., the DL PRS request may be propagated via a backhaul connection between ANs). Accordingly, in some cases, the configuration and the UL PRS may be transmitted in an on-demand fashion based on received request(s) from the UE, which is in contrast to periodic transmissions.

The UE may measure the DL PRS from different ANs to calculate time differences and report such measurements, for example, to be forwarded to a location server for UE position estimation.

Figure 16:
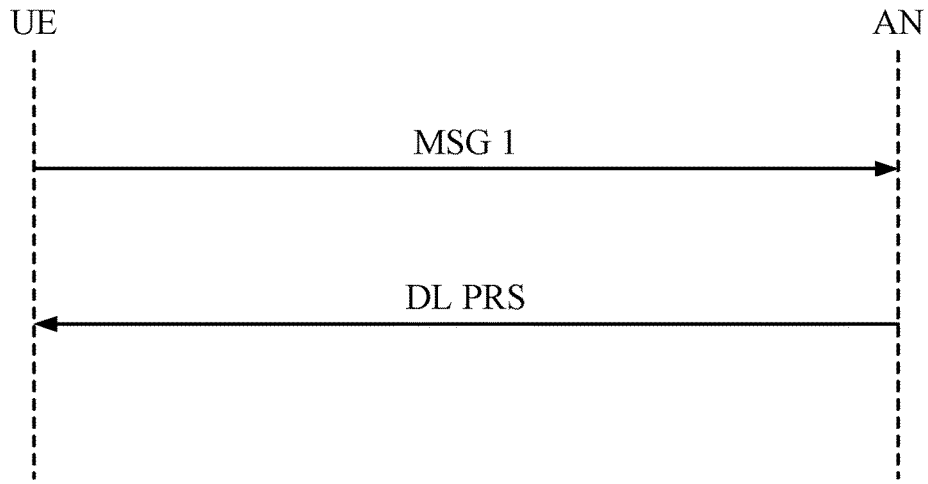
FIG. 16 illustrates an example downlink (DL) based UE positioning scenario, in accordance with aspects of the present disclosure.
Figure 17:
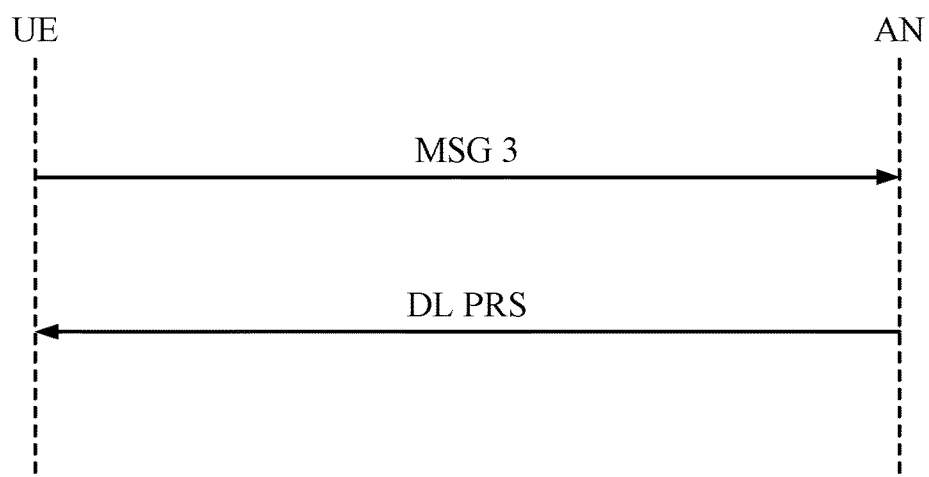
FIG. 17 illustrates an example downlink (DL) based UE positioning scenario, in accordance with aspects of the present disclosure.

According to one or more aspects of the disclosure, a configuration of the DL-PRS request channel may be provided via an MSIB. In some cases, the DL-based UE positioning request channel may request that the channel includes a payload comprising a UE-ID and/or a positioning request (with DMRS for payload demodulation). For example, FIG. 16 illustrates an example of a downlink (DL) based UE positioning scenario, in accordance with aspects of the present disclosure. As shown, a message 1 (MSG 1) may be sent by the UE to request a downlink (DL) positioning reference signal (PRS). In some cases, the MSG 1 may be sent using a Physical Random Access Channel (PRACH). When the network acquires the MSG 1, the network may respond with the DL PRS directly without sending a separate configuration. Accordingly, the DL PRS may be transmitted by the network on-demand. In some cases, as shown in FIG. 17, another example of a DL based UE positioning scenario may include transmitting a message 3 (MSG 3) from the UE to the network as the request. In some cases, the MSG 3 may be sent using a Physical Uplink Shared Channel (PUSCH). When the network acquires the MSG 3, the network may respond with the DL PRS directly without sending a separate configuration.

Figure 15:
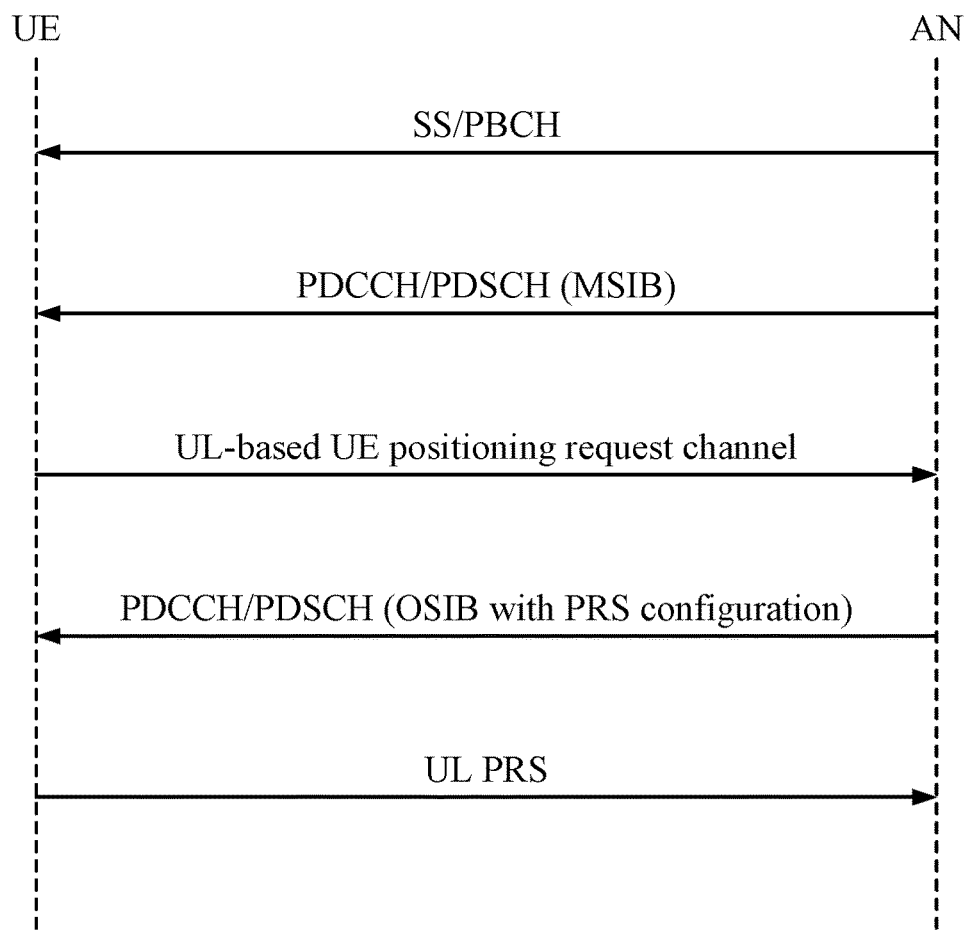
FIG. 15 illustrates an example uplink (UL) based UE positioning scenario, in which aspects of the present disclosure may be practiced.

FIG. 15 illustrates an example uplink (UL) based UE positioning scenario, in accordance with aspects of the present disclosure. As shown in FIG. 15, the example of On-demand UL-based UE Positioning includes a number of operations that make up the positioning procedure.

Specifically, as shown, a SS/PBCH (synchronization signal/physical broadcast channel) transmission and a PDCCH/PDSCH (MSIB) transmission may be provided from the network (AN) to the UE. The UE receives these transmissions and reads the MIB/MSIB (master information block/a minimum system information block), which may indicate that UL-based positioning can be supported.

As shown, the UE may request that the network send an UL PRS configuration (e.g., when UE positioning service is triggered), for example, by sending a UL-based UE positioning request. The network may then send an OSIB comprising UL PRS configuration in response to the request from the UE. Accordingly, in some cases, the configuration may be transmitted in an on-demand fashion based on received request(s) from the UE, which is in contrast to periodic transmissions.

The UE may then begin to transmit UL PRS, according to the configuration, to be detected by one or more base stations (e.g., within the serving cell and neighbor cell) in the network. Each base station may then measure a UL PRS and report the timing (e.g., to a location server) so time differences may be calculated and the UE position may be estimated therefrom.

According to one or more aspects of the disclosure, a UL-based UE positioning request channel may request signal configuration in MSIB. Further, the request signal may include a payload comprising a UE-ID and a positioning request. Furthermore, a DMRS for payload demodulation may also be included. In some cases format of the UL PRS may depend on a radio resource control state of the UE. For example, a UL PRS may be PRACH like when the UE is in an RRC-Connected inactive state or the UL PRS may be SRS like when the UE is in an RRC-Connected active state.

According to one or more aspects, a unified PRS design may be provided. For example, a PRS may be unified across different NR use cases such as eMBB, mMTC and URLLC. The PRS may also be unified across different frequency bands that may include, for example, frequency bands below 6 GHz bands and above 6 GHz bands.

Further, according to one or more aspects, a baseline PRS may be defined. One or more examples may include scaling the baseline PRS (e.g., numerology scaling) to the desired PRS that may fit a use case requirement. For example, mMTC may support PRS with a narrower bandwidth than eMBB/URLLC. In one or more cases, a PRS configuration may be signaled in system information (e.g., OSIB). The system information may include one or more of PRS numerology and/or PRS periodicity and RS pattern.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 10A:
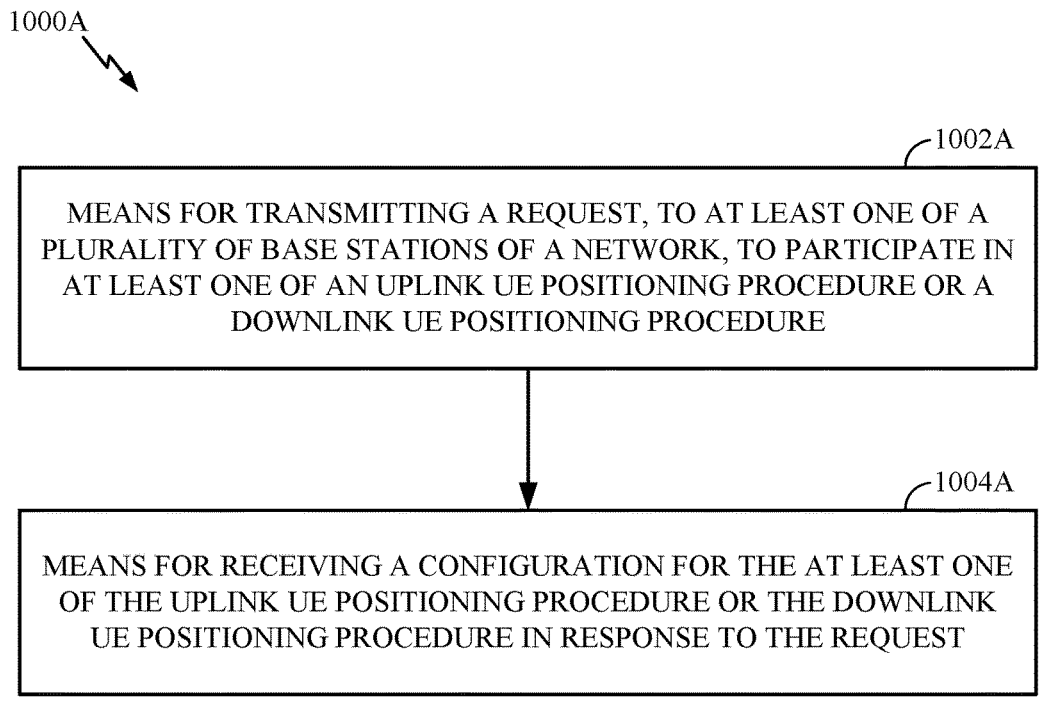
FIG. 10A illustrates example components capable of performing the operations shown in FIG. 10, in accordance with certain aspects of the present disclosure.
Figure 11A:
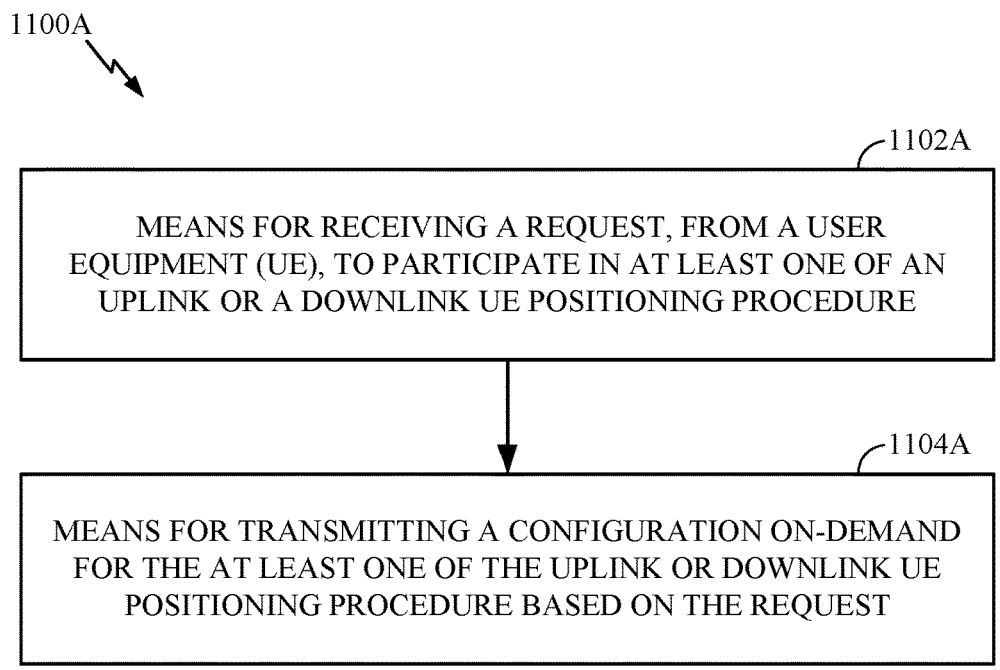
FIG. 11A illustrates example components capable of performing the operations shown in FIG. 11, in accordance with certain aspects of the present disclosure.
Figure 12A:
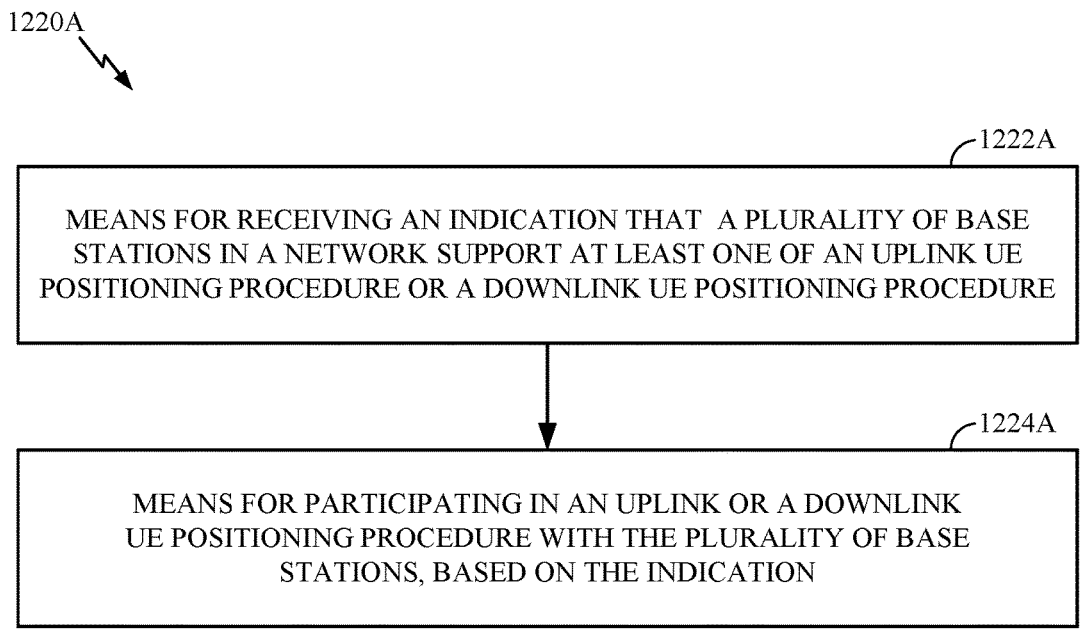
FIG. 12A illustrates example components capable of performing the operations shown in FIG. 12, in accordance with certain aspects of the present disclosure.
Figure 13A:
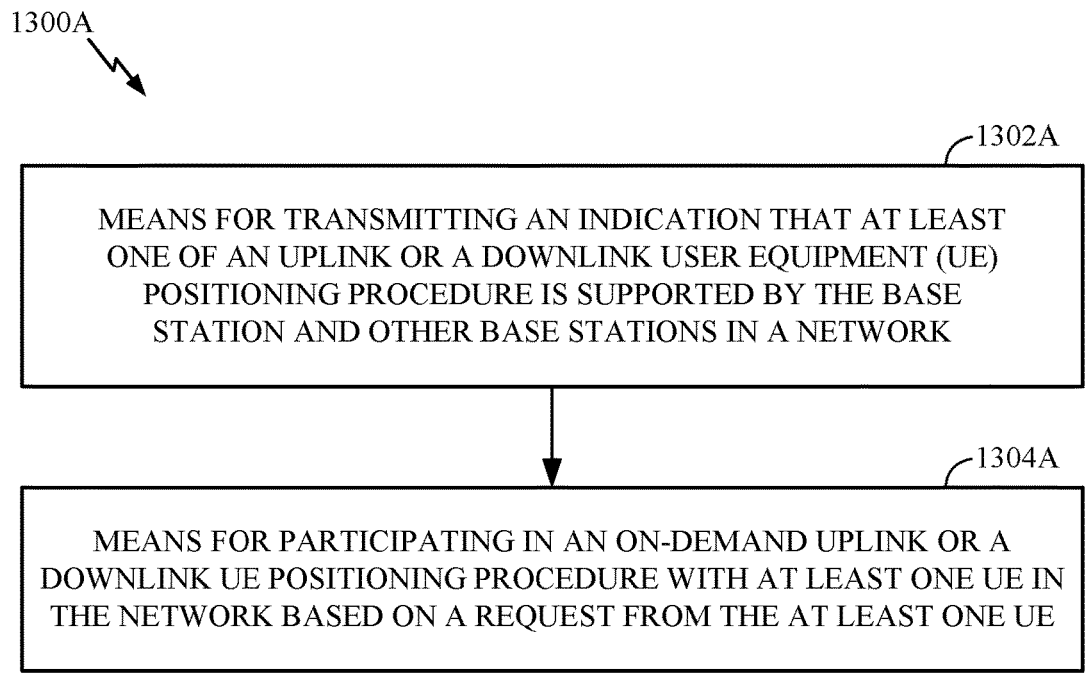
FIG. 13A illustrates example components capable of performing the operations shown in FIG. 13, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000 illustrated in FIG. 10, operations 1100 illustrated in FIG. 11, operations 1200 illustrated in FIG. 12, and operations 1300 illustrated in FIG. 13, correspond to means 1000A illustrated in FIG. 10A, means 1100A illustrated in FIG. 11A, means 1200A illustrated in FIG. 12A, and means 1300A illustrated in FIG. 13A, respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for participating, means for measuring, means for reporting, means for operating, and/or means for broadcasting may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE) comprising:
   receiving a synchronization signal using a physical broadcast channel (SS/PBCH) from a base station;
   receiving a minimum system information block (MSIB) or a master information block (MIB) indicating support for uplink UE positioning, the MIB or MSIB received using a Physical Downlink Control Channel (PDCCH) or a Physical Downlink Shared Channel (PDSCH);
   transmitting a request to participate in at least an uplink UE positioning procedure using a UE positioning request channel; and
   receiving a configuration for the uplink UE positioning procedure using the PDCCH or the PDSCH, wherein the configuration is included in a system information block (SIB), wherein the configuration comprises positioning reference signal configuration; and
   transmitting an uplink positioning reference signal according to the configuration.

2. The method of claim 1, wherein the positioning reference signal has:
   a first format if the UE is in a first radio resource control (RRC) state; or
   a second format if the UE is in a second radio RRC state.

3. The method of claim 2, further comprising:
   determining the first format or the second format of the positioning reference signal based on at least one of:
   a service requirement of communications performed by the UE; or
   operating bandwidth of the communications.

4. A method for wireless communication by a base station (BS) comprising:
   transmitting a synchronization signal using a physical broadcast channel (SS/PBCH) to a user equipment (UE);
   transmitting a minimum system information block (MSIB) or a master information block (MIB) indicating support for uplink and/or downlink UE positioning, the MIB or MSIB transmitted using a Physical Downlink Control Channel (PDCCH) or a Physical Downlink Shared Channel (PDSCH);
   receiving a request from the UE to participate in at least one of an uplink or a downlink UE positioning procedure;
   in response to the request, transmitting a configuration for the at least one of the uplink or downlink UE positioning procedure using the PDCCH or the PDSCH, wherein the configuration is included in a system information block (SIB), wherein the configuration comprises positioning reference signal configuration; and
   receiving an uplink positioning reference signal at the base station, in accordance with the configuration, and wherein:
   the request is to participate in the uplink UE positioning procedure;
   the configuration is for the uplink UE positioning procedure;
   a first format if the UE is in a first radio resource control (RRC) state; or
   a second format if the UE is in a second radio RRC state.

5. The method of claim 4, further comprising determining the first format or second format based on at least one of:
   a service requirement of communications performed by the UE; or
   operating bandwidth of the communications.

6. The method of claim 4, wherein the configuration indicates at least one of a numerology, periodicity, or reference signal (RS) pattern for the positioning reference signal.

7. An apparatus for wireless communication by a user equipment (UE) comprising:
- at least one processor coupled to a memory, the processor configured to generate a request to participate in at least one of an uplink UE positioning procedure or a downlink UE positioning procedure; and
- a transceiver coupled to the at least one processor, the transceiver and at least one processor configured to:
  - receive a synchronization signal using a physical broadcast channel (SS/PBCH);
  - receive a minimum system information block (MSIB) or a master information block (MIB) indicating support for the uplink and/or downlink UE positioning, the MIB or MSIB transmitted using a Physical Downlink Control Channel (PDCCH) or a Physical Downlink Shared Channel (PDSCH);
  - transmit the request to participate in the at least one of an uplink UE positioning procedure or downlink UE positioning procedure;
  - receive a configuration for the at least one of the uplink UE positioning procedure or the downlink UE positioning procedure in response to the request, the configuration received using the PDCCH or the PDSCH, wherein the configuration is included in a system information block (SIB), wherein the configuration comprises positioning reference signal configuration; and
- receive a downlink positioning reference signal or transmit an uplink positioning reference signal according to the configuration, wherein:
- the request is to participate in the uplink UE positioning procedure and the received configuration is for the uplink UE positioning procedure, and
- the at least one processor and the transmitter further configured to:
  - transmit an uplink positioning reference signal in accordance with the configuration.

* * * * *